United States Patent [19]

Reinholtz

[11] Patent Number: 4,666,204

[45] Date of Patent: May 19, 1987

[54] RESTAURANT BUS

[76] Inventor: Richard B. Reinholtz, 320 Bannack Ct., N. Missoula, Mont. 59801

[21] Appl. No.: 802,815

[22] Filed: Nov. 29, 1985

[51] Int. Cl.⁴ .............................................. B62D 47/02
[52] U.S. Cl. ................................................ 296/24 R
[58] Field of Search ...................... 105/327; 296/24 R; 114/188, 195; 108/25

[56] References Cited

U.S. PATENT DOCUMENTS

| | | | |
|---|---|---|---|
| 1,108,614 | 8/1914 | Patterson | 296/24 R |
| 1,170,711 | 2/1916 | Trombly | 296/24 A |
| 1,176,106 | 3/1916 | True | 296/24 A |
| 1,240,163 | 9/1917 | Abadie | 312/285 |
| 1,523,642 | 1/1925 | Harvey | 105/327 |
| 2,419,498 | 4/1947 | Newton | 105/327 |
| 2,434,841 | 1/1948 | Dittrich | 105/327 |
| 3,649,423 | 3/1972 | Wilton et al. | 108/25 |
| 3,874,009 | 4/1975 | Nosaka et al. | 296/24 R |
| 4,177,737 | 12/1979 | Brickman | 108/25 |
| 4,270,319 | 6/1981 | Spasojevic | 52/36 |
| 4,550,946 | 11/1985 | Hanemaayer | 296/156 |

*Primary Examiner*—Randolph A. Reese
*Assistant Examiner*—Carol L. Olson
*Attorney, Agent, or Firm*—Keith S. Bergman

[57] ABSTRACT

A self-propelled bus-type vehicular structure for use as a mobile restaurant. The vehicle has separately defined portions for food preparation and food service and consumption. The vehicle provides a restaurant facility during ground transit to simultaneously combine the functions of eating with those of sight-seeing. The restaurant furniture relating to both food service and consumption is particularly configured for use in a vehicular structure and particularly adapted for use during transit of that structure.

3 Claims, 7 Drawing Figures

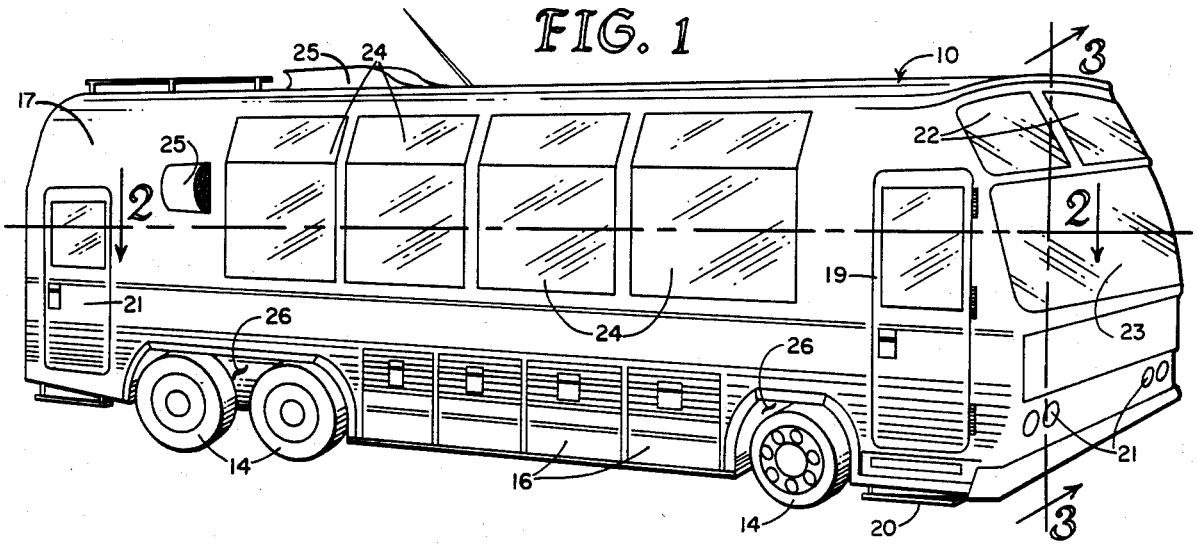
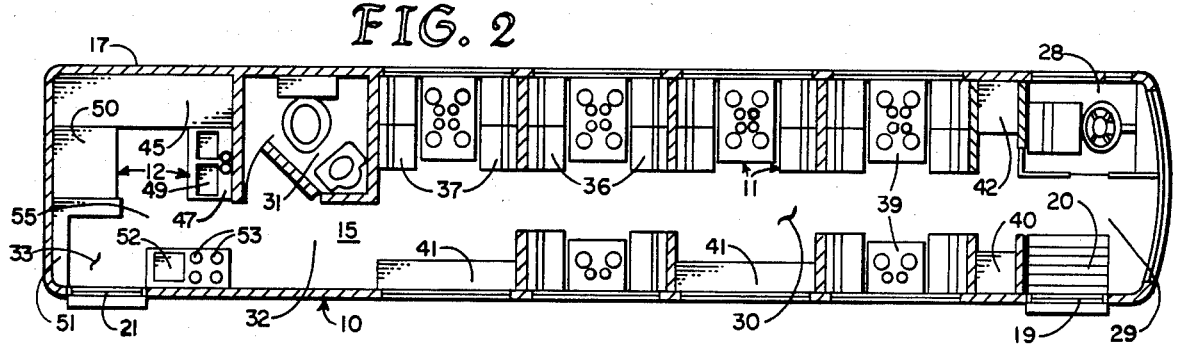

RESTAURANT BUS

BACKGROUND OF INVENTION

1. Related Applications

There are no applications related hereto heretofore filed in this or any foreign country.

2. Field of Invention

My invention relates generally to bus-type vehicles for road transportation and more particularly to such a vehicle that provides full service restaurant facilities for use during transit.

DESCRIPTION OF PRIOR ART

Two popular elements of entertainment have been and generally are the consumption of food and sight-seeing. Each of these functions in the past usually has been carried out independently, particularly in the case of automotive-type vehicles. The instant invention provides a bus-type vehicle whereby the two functions may be combined to simultaneously provide the advantages of each.

Wheeled road-type land vehicles heretofore have been used, undoubtedly substantially contemporaneously with their creation, for sight-seeing endeavors of various types and such vehicles often have been adapted to carry a plurality of persons.

Land vehicles have also in some circumstances heretofore been associated with food and food service. The vehicular food stand which may be moved to various locations for service of food therefrom is well known, in smaller forms in the traditional street vendor's cart and in larger forms in quite sophisticated vehicles providing food service facilities at parks, fairs and the like. This type of vehicular food provider and server has, on occasion, provided full food service of substantially the same caliber as had in ordinary stationary restaurants devoted entirely to this purpose. The essence of this type of food service vehicle remains, however, the provision of food for consumption elsewhere than in or on the vehicle and its locomotive facilities are used to move the structure during periods of non-use as a food serving facility. This type of vehicle is distinguishable from the instant invention in that it generally provides no facility for patrons to eat food therein or thereon and it does not transport patrons during the course of their consumption of food provided therefrom.

Another type of food service in vehicles arises in the passenger transportation industry generally where, by reason of convenience or necesssity, food must be provided for patrons during transportation because of the duration of the transport operation or the particular time period during which it is carried out, should this coincide with normal eating periods. This type of food service is epitomized by the airplane, railroad train and ocean-going vessel.

The primary purpose of this type of food service has been to provide sustenance during travel, and the various facilities and operations therefore have been essentially related to this purpose. In general food preparation and service facilities on trains and ships, where area therefore is substantially unlimited, have been the same, both in their physical extent and their epicurean sophistication, as those common in the stationary restaurant trade generally. The appliances are of standard configuration and operation and the food to be prepared is commonly of the ordinary unprepared, primitive type.

In the case of the airplane food service, facilities and appliances are extremely limited, if at all existent, because of space and weight limitations and the food served is substantially entirely pre-prepared in its final form externally of the airplane in which it is to be served. Such processed food is commonly prepackaged in serving portions and prepared very little immediately prior to service, such as by heating to make it more palatable and aesthetically desirable for patrons. The primary purpose of such facility has not been to provide an epicurean type of food and food service commonly associated with restaurants catering to human entertainment and it has not done so.

Food service heretofore has not generally been provided on passenger carrying, over-the-road type vehicles because in their normal operation it is not necessary. Such vehicles may be scheduled to be present at existing stationary restaurant facilities at accustomed times for food consumption and use has been made of such secondary facilities in most such transportation operations. There are also physical and legal restrictions on the nature of such vehicles, especially as to size, configuration and health and safety standards, and these factors also have not been conducive to the providing of food facilities in such vehicles.

Railway or boat food service facilities have heretofore provided substantially full restaurant service. Such facilities, however, have provided this type of service with traditional restaurant fixtures and furnishings and could do so only because of substantial spacial areas that could be devoted to such purposes. Traditional mobile home and travel trailers have provided reasonably full service food facilities, but only because this is allowed by their limited number of occupants in relation to their available area. Such is not the case, however, with an over-the-road bus-type vehicle carrying a plurality of passengers desiring epicurean food service. Because of the areal and other physical limitations involved, ordinary restaurant fixtures and furnishings cannot be adapted for such purpose in bus-type vehicles, at least with any economy and feasibility.

Since the combination of an eating facility with a sight-seeing facility normally is an economic venture, this sets certain practical limitations upon both maximum areas that can be occupied for particular purposes and the minimum number of people that can and must be served in such facility. These limitations necessarily rule out the use of traditional restaurant arrangements, furniture and fixtures because of the space occupied thereby and the lack of area remaining for patrons' occupancy and service. If such facilities be used in a bus-type vehicle, the resultant combination is not economically feasible.

My instant invention differs from the art described firstly by providing an epicurean food service in a bus-type vehicle during transit thereof for sight-seeing purposes, and secondly in providing facilities and furniture in such vehicle that have structures necessarily determined and limited by their functions to allow vehicle use by a maximum number of patrons. These features combine synergistically to provide economic feasibility for such a vehicle and its operation.

SUMMARY OF INVENTION

My invention provides generally a self-propelled bus having a smaller food preparation and service area and a substantially larger food consumption area.

The vehicle provides a planar floor upon an ordinary bus chassis with a structurally interconnected vehicle body defining an enclosure with height sufficient to allow comfortable walking passage therein. The food service area comprises approximately one-fourth of the available floor area and the food consumption area substantially its remainder. The food consumption area provides cellularly defined and fixedly positioned booth-type table and seat arrangements with tables having indentations to positionally maintain utensils during the motions of ordinary transit. The food consumption area provides medial isle space for transit of service personnel and patron access. The food service area provides furniture and fixtures having normal functions available in stationary restaurants but does so with a particular efficient arrangement and appliances of smaller, more compact nature. The food service appliances are powered ultimately by the motor of the bus. Space is provided for lavatory facilities, storage and driver. The peripherally defined bus body provides window area substantially greater than a normal bus.

In operation my bus institutes its tour from a central terminal and returns thereto after food service and sightseeing for appropriate access by patrons.

In providing such a restaurant bus it is:

A principal object of my invention to create a self propelled over-the-road bus-type vehicle that has configuration and facilities such that food may be prepared and consumed and sight-seeing may be done simultaneously therein during transit by a plurality of patrons.

A further object of my invention to provide such a vehicle that has sufficient space and facilities to allow sophisticated epicurean operation while yet allowing use by a sufficient number of patrons to provide economic feasibility.

A still further object of my invention to provide such a vehicle that has window walls of substantial area, unencumbered by furniture or fixtures, to provide a passenger with a clear and view of the environs surrounding the vehicle.

A still further object of my invention to provide such a vehicle that has ordinary lavatory and driver facilities in addition to food service and consumption areas.

A still further object of my invention to provide such a restaurant bus that is of new and novel design, of rugged and durable nature, of simple and economic manufacture and one otherwise well suited to the uses and purposes for which it is intended.

Other and further objects of my invention will appear from the following specification and accompanying drawings which form a part hereof.

In carrying out the objects of my invention, however, it is to be understood that its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an isometric surface view of my restaurant bus showing its various peripheral parts, their configuration and relationship.

FIG. 2 is a horizontal cross-section or plan view of the bus of FIG. 1, taken on line 2—2 thereon in the direction indicated by the arrows.

FIG. 3 is a vertical cross-sectional view through the bus of FIG. 1, taken on the line 3—3 thereon in the direction indicated by the arrows thereon.

DESCRIPTION OF THE PREFERRED EMBODIMENT

Figure 4:
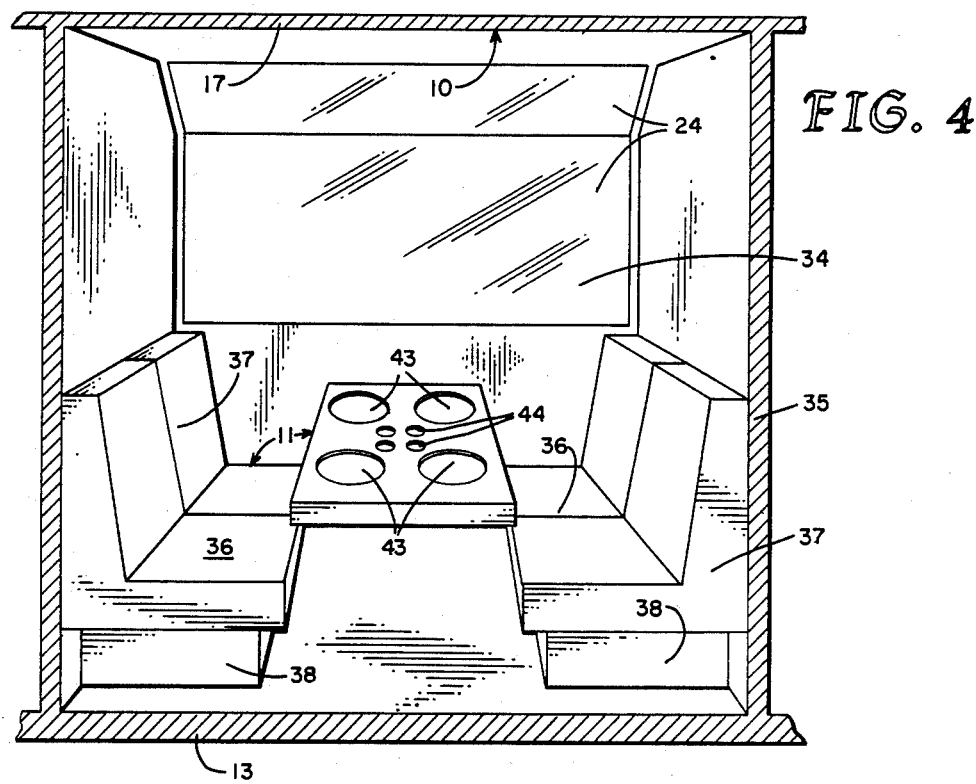
FIG. 4 is a perspective interior view of one of the cellular booths of my invention.
Figure 5:
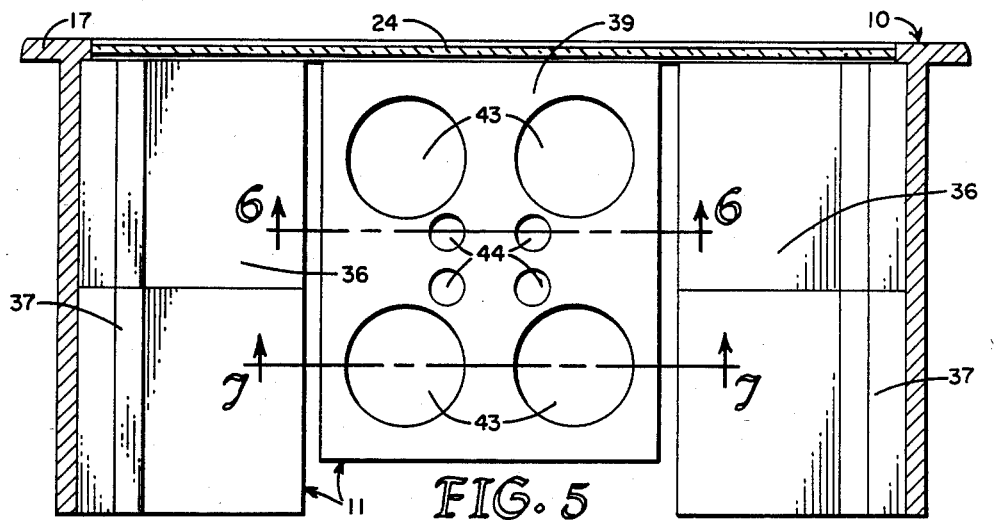
FIG. 5 is an orthographic top or plan view of the booth of FIG. 4, showing its various elements from this aspect.
Figure 6:
FIG. 6 is a vertical cross-sectional view through the cup holding indentations of the table of FIG. 5, taken on the line 6—6 thereon in the direction indicated by the arrows.
Figure 7:
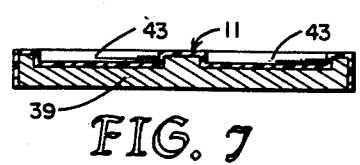
FIG. 7 is a vertical cross-sectional view through the plate holding indentations of the table of FIG. 5, taken on the line 7—7 thereon in the direction indicated by the arrows.

Referring now in more detail to the illustrated specific embodiment of my invention, it will be seen that it generally comprises bus-type vehicle 10 defining a first larger area for food service furniture 11 and a second smaller area for food preparation furniture and fixtures 12.

Vehicle 10 provides elongate, rigid chassis 13 of the ordinary rigid beam, ladder-type construction supported for locomotion on an underlying road surface by plural wheel trucks 14. The chassis frame supports rigid parallel floor 15 which may be of the single level variety illustrated or, if desired, may embody various floor levels according to principals heretofore known. Peripherally defined storage bins 16 are provided depending beneath chassis 13 to provide storage area for any desired articles and also to improve the ascetic appearance of the exterior of the vehicle beneath the chassis. A normal driver compartment 28, embodying the various accounterments common to driver compartments of ordinary buses, is provided in the right forward portion of the vehicle and supplied with the necessary devices and mechanical linkages used by a driver to accomplish bus locomotion.

Peripheral vehicle body 17 extends vertically from the lower portion of storage bin 16 upwardly above floor 15 a distance sufficient to define an enclosed passenger chamber 18 of height sufficient to allow normal walking of patrons of ordinary height within the enclosure when they are supported on the vehicle floor. The body defines principal forward entry door 19 serviced by steps 20 to aid access and rearward emergency door 21 in the rear portion of the body. The upper portion of the front of the body defines ordinary upper glass window structure 22 with windshield 23 therebelow. The body side walls define plural, enlarged picture-type windows 24 to provide substantial viewing area for bus patrons. The bus body defines appropriate orifices and supports for the ordinary accessories associated therewith such as venting structures 25, headlights 26, wheel wells 27 and other similar structures common to bus-type vehicles or required for their operation.

The configuration of the body is not particularly critical so long as it fulfills the essential requirements recited. Many commercial bus-type vehicles of commerce substantially fulfill these requirements and well may be used as a chassis and body for my bus. The body style should provide maximum enclosed space for any particular vehicle type. Its desirability is increased if the structure provide an external surface of some ascetic appeal, simple and easy passenger access and window structure that allows patrons a simple and easy view of the bus environs during use. Normally an ordinary bus body of 40 to 60 feet in length will be adequate for economical operation of my vehicle though, rather obviously, the larger the vehicle is, the more economical is its operation. Size, of course, is limited by physical restrictions for transport on the public roadways and, in some instances, possibly also by particular environmental restrictions, such as low overhead structures, sharp corners or the like, in the transit course of the bus. An articulated bus-type vehicle (not shown) is adaptable for the purposes of my invention, if such a structure may be used in the environment to which it is to operate.

The forward portion of chamber 18 provides driver compartment 28 with its various accouterments on the left of the access door, access steps and vestibule structure 29 which are to the right. The immediately rearward medial forward portion 30 of the chamber provides the larger food service subdivision of the body structure with food service furniture 11 carried therein. Immediately rearwardly of the medial forward portion 30 is restroom structure 31 on the left with by-pass hallway 32 on the right. This by-pass hallway extends to rearwardmost food preparation area 33 carrying the food preparation furniture and fixtures 12.

Food service furniture 11 in medial forward portion 30 of the bus comprises a plurality of booth structures isolated in booth cells 34. These cells are defined on their lateral or outer side by the bus body structure, at the forward and rearward sides by cellular walls 35 and are open on their inner sides to allow food service and ingress and egress of patrons. Such structures provide a semi-private atmosphere in which meals may be eaten. If desired, cellular walls 35 may be of a removable nature (not shown) so that the entire interior of my bus, or a part of it, may be opened up into one or more larger open spaces for use by larger parties.

Each booth cell contains similar paired opposed bench seats 36 having associated upstanding backs 37 and pedestals 38 supporting the seats at an appropriate distance above the floor for comfortable sitting. These seat structures normally will be of substantially the same length (lateral dimension) as that of the cellular walls immediately adjacent the backs thereof. The seats 36 of a booth cell are spaced apart from each other sufficiently to allow persons to be seated on each in a position facing each other, normally at a distance of about 30 inches.

Elongate slab-like tables 39 are supported in a medial position in each booth cell between the opposed seat structures and at a comfortably spaced distance above the seats. The tables are supported in cantilever fashion, in the instance illustrated by mechanical interconnection with the bus body 17 laterally outwardly adjacent thereto. This mechanical fastening may be accomplished by means known in the prior art and is well within the skills of an ordinary mechanic.

Normally the seat structures will not only be mechanically interconnected with each other at adjoining surfaces but will also be mechanically interconnected to the adjacent booth cell walls 35 and bus body structure 17 to positively positionally maintain them during use and vehicle transit. The tables will normally be at a standard height for comfortable dining by an average sized patron, which is approximately 30 inches above the bus floor and 13 inches above the supportive position of the upper surface of seats 36.

Both booths and the tables must be formed of some rigid durable material of reasonable strength to fulfill their purposes. The surfaces of the seats and backs are normally padded and covered with some ordinary furniture covering material, preferably fabric type upholstery of one sort or another. These materials are of the same type as used in similar structures in stationary restaurants of the present day.

The arrangement of booth cells for maximum efficiency within the bus structure is shown in the plan view of FIG. 2, with a plurality of such structures on one side of the vehicle adapted for use by four people sitting in groups of two on each seat and another grouping of such structures on the opposite second side of the vehicle adapted for use by two people sitting with one on each seat. A medial corridor or aisle remains unoccupied to serve as ingress and egress means for patrons of the booth cells and also as an access facility for serving personnel. Preferably the booth cells are so arrayed, with some spaces left between some units, to accommodate storage cabinets 40 and serving tables 41 of such size and number as may be required for efficient food service, utensil containment and storage. Normally a space will be provided between booth cells for coat closet 42 to contain and store overcoats or other hand carried articles that might be brought into the bus by patrons and desired to be stored during dining.

Each table top 39 is of some thickness and defines in its upper portion larger cylindrical indentations 43 and smaller cup indentations 44 to aid in maintaining plates and cups, respectively, therein during motion of the vehicle. These indentations in a particular case, obviously, must be appropriately shpaed and sized to accomplish their purpose. Side rails (not shown) might be added to the peripheral edges of the table to extend a spaced distance upwardly to aid in maintaining dishes thereon but, in general, this is not necessary as the forces that might be imposed upon such items are generally not great enough in ordinary bus transit to justify use of the structures. Various other indentations (not shown) might also be defined in the table top for other dishes but, in general, this again is not ordinarily necessary.

Food preparation fixtures and appliances 12 are carried in rearwardmost food preparation area 33, especially as shown in the illustrations of FIGS. 2 and 3. These fixtures and appliances provide the ordinary functions that are provided by most stationary restaurant kitchens, but they are generally smaller in size and more efficient in function and arrangement. Work-height counter 45 is provided along the first lateral side of area 33, opposite the rear door, with storage cabinets 46 above and below the counter. Extending inwardly from counter 45 in its forward portion is sink counter 47, again having additional storage cabinets 48 therebelow with sink 49 carried in the medial part thereof. Extending inwardly from the rearward portion of work counter 45 is refrigerator cabinet 50 providing ordinary refrigerator and freezer facilities. "L" shaped storage cabinets 51 extend, as illustrated, laterally outwardly from the inner surface of the refrigerator cabinet to the second side of the bus body rearwardly of the rear door. Counter height grill 52 and stove 53 are provided inwardly adjacent the bus body on the second or right side of the food preparation area, immediately forwardly of the rear door, and microwave and convection oven structures 54 are supported immediately thereabove on that same body wall. These structures are all configured and sized substantially as illustrated to leave aisle 55 for clear access to the food preparation furniture and appliances and also to allow access to the rear door from passageway 32.

Water heating and supply systems 55 are preferably carried below the floor structure of the bus and are powered, ultimately, by the bus motor, generally by intermediate means of electricity generated by that motor. Similarly refrigeration structure 50 is preferably powered by electricity generated by the bus motor. Grill 52 and stove plates 53 are commonly heated by liquified natural gas carried in tank 56 located below the floor structure of the vehicle. An appropriate ventilating system (not shown) is provided to service the entire bus structure and particularly the food preparation area. This system is vented through vent structures 25 to the outside atmosphere. Various other accouterments common to present day commercial restaurants such as television facilities, seating area for service personnel and like structures may be included in my bus, if desired, but they are not necessary to its essential operation, are well known in the restaurant arts generally and therefore are not illustrated in detail.

Having thusly described the structure of my invention, its use may be understood.

Firstly, a bus structure is formed according to the foregoing specification and outfitted with food service furniture and food preparation furniture and fixtures as described. The bus is supplied with driver and appropriate food preparation and service personnel, usually one cook and one waiter, and it is then ready for operation. Normally, but not necessarily, financial arrangements for use of the vehicle by patrons are made in some central location from which the vehicle operates rather than from any facilities carried in or on the vehicle itself.

After making appropriate financial arrangements, a patron or group of patrons enter the bus and are seated in one or more of the booth cells defined in the forward medial food service area. When the bus is loaded with all patrons for a particular trip and all patrons have been appropriately seated, it then begins its course of transit during which a meal will be served. For most efficient operation, this course of transit normally will begin at a terminal and end at the same terminal point. Though the period of transit may last for any desired time, it commonly will be for a period of from one to three hours as this time will allow the normal leisurely consumption of a meal.

After the bus commences its transit, the food desired by patrons is appropriately prepared by the cook in the food preparation area and upon its preparation, it is served by food service personnel to the patrons in the booth cells. The food may generally be of any desired variety, but commonly for most efficient operation, it will include a prearranged menu of relatively few selections, at least some of which may be largely pre-prepared so that no excessive amount of preparation is required on the bus. Such foods commonly may be frozen and reheated or may be items requiring only grilling or short, relatively simple cooking procedures such as steaming, sauteing or the like. This type of food and food preparation is common in many stationary restaurants of the present day, especially those specializing in faster service. The food must, of course, meet appropriate epicurean standards.

Bar functions may be provided and various beverages, either alcoholic or non-alcoholic, served from the food service area. Various types of entertainment such as television, music and the like might be provided during the meal if desired, but in general the principal entertainment most commonly will be the viewing of scenery in the environs of the course of bus travel during the meal period.

Upon completion of the meal, the bus is returned to its original terminal and its patrons may go about their further activities from that point as in the case of any stationary restaurant. With a timing period for the meal of one to three hours, commonly, more than one meal service may be had in a single vehicle for a particular meal. Such multiple service obviously increases the economic efficiency and feasibility of the vehicle and may provide greater profit from its operation.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A bus-type vehicle having facilities for food service, comprising, in combination:

an elongate chassis, having propulsion means and supported by plural wheel trucks for locomotion on an underlying surface, said chassis supporting a substantially horizontal floor with a peripheral body extending upwardly therefrom a distance greater than the height of a person to occupy the structure to enclose an internal chamber wherein a patron may freely walk;

said internal chamber having a forward access area and driver compartment, a medial forward food service area rearwardly of the access area and driver compartment, a toilet facility rearwardly of the food service area and a food preparation area rearwardly of the toilet area with aisle area providing access between any of said areas and ingress and egress means at each end, a storage facility including at least a first storage compartment positioned between said driver compartment and said medial food service area and a second storage compartment positioned between said forward access area and said medial food service area;

the forward medial food service area carrying food service furniture including a plurality of booth cells defined by laterally extending partition walls therebetween, each said booth cell having similar spaced opposed bench-type seats facing each other and adjacent each of said partition walls and a table supported at a spaced distance above said bench seats and extending therebetween, said medial service area provided with at least one service table secured therein; and the food preparations area having counters and cabinets about the periphery thereof for food storage and carrying food preparation fixtures including a refrigerator, a freezer, a stove, a microwave oven and a sink.

2. The invention of claim 1 further characterized by: the tops of the tables of each booth cell defining indentations to positionally maintain at least a plate and a cup for each person to be served therein and the food service area having at least one food service table, storage cabinets for food and service utensils and storage areas for personal items of patrons.

3. The vehicle of claim 1 providing restaurant service during its transit over a predetermined road course during the preparation, service and consumption of food therein.

* * * * *